(12) United States Patent
Gasworth et al.

(10) Patent No.: US 6,376,064 B1
(45) Date of Patent: Apr. 23, 2002

(54) LAYERED ARTICLE WITH IMPROVED MICROCRACK RESISTANCE AND METHOD OF MAKING

(75) Inventors: Steven Marc Gasworth, Farmington Hills, MI (US); Daniel Robert Olson, Voorheesville, NY (US); Dimitris Katsamberis, Novi, MI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/633,714

(22) Filed: Aug. 7, 2000

Related U.S. Application Data

(63) Continuation of application No. 09/460,057, filed on Dec. 13, 1999, now abandoned.

(51) Int. Cl.$^7$ .............................. B32B 5/16; B05D 1/36; C08J 7/18
(52) U.S. Cl. ................... 428/331; 427/407.1; 427/489; 428/336; 428/447; 428/448; 428/451
(58) Field of Search ............................ 427/407.1, 489; 428/331, 332, 334, 335, 336, 412, 447, 451, 448

(56) References Cited

U.S. PATENT DOCUMENTS

| | | | |
|---|---|---|---|
| 4,027,073 A | 5/1977 | Clark | 428/412 |
| 4,159,206 A | 6/1979 | Armbruster et al. | 106/287.12 |
| 4,224,378 A | 9/1980 | Schroeter et al. | 428/412 |
| 4,242,381 A | 12/1980 | Goossens et al. | 427/387 |
| 4,374,674 A | 2/1983 | Ashby et al. | 106/287.12 |
| 4,419,405 A | 12/1983 | Ashby et al. | 428/412 |
| 4,624,870 A | 11/1986 | Anthony | 427/387 |
| 4,842,941 A | 6/1989 | Devins et al. | 428/412 |
| 4,863,520 A | 9/1989 | Factor et al. | 106/287.12 |
| 4,914,143 A | 4/1990 | Patel | 522/148 |
| 4,927,704 A | 5/1990 | Reed et al. | 428/221 |
| 5,051,308 A | 9/1991 | Reed et al. | 428/412 |
| 5,156,882 A | 10/1992 | Rzad et al. | 427/489 |
| 5,298,587 A | 3/1994 | Hu et al. | 528/10 |
| 5,320,875 A | 6/1994 | Hu et al. | 427/493 |
| 5,433,786 A | 7/1995 | Hu et al. | 118/723 E |
| 5,494,712 A | 2/1996 | Hu et al. | 427/489 |
| 5,635,087 A | 6/1997 | Schiller et al. | 219/121.43 |
| 5,718,967 A | 2/1998 | Hu et al. | 428/216 |
| 5,869,185 A | 2/1999 | Bahr et al. | 428/412 |
| 5,900,284 A | 5/1999 | Hu | 427/489 |

OTHER PUBLICATIONS

Standard Test Methods for Measuring Adhesion by Tape Test, ASTM D 3359–92a (Jul. 1992).

Standard Practice for Operating Light–Exposure Apparatus (Xenon–Arc Type) with and without Water for Exposure of Nonmetallic, ASTM G 26–90 (Mar. 1990).

Encyclopedia of Polymer Science and Technology, vol. 1, pp. 246–342, Interscience Publishers, John Wiley and Sons (1964).

*Primary Examiner*—D. S. Nakarani
(74) *Attorney, Agent, or Firm*—Robert P. Santandrea; Noreen C. Johnson

(57) ABSTRACT

The invention relates to a multilayer article which includes a substrate, a first layer comprising a partial condensate of a diorganodiorganooxysilane having the formula $R_2Si(OR')_2$ or an organotriorganooxysilane having the formula $RSi(OR')_3$, or both, where R is independently selected from the group consisting of alkyl groups containing about 1–3 carbon atoms, aromatic groups containing about 6–13 carbon atoms, the vinyl radical, the 3,3,3-trifluoropropyl radical, the gamma-glycidoxypropyl radical and the gamma-methacryloxypropyl radical, and R' is independently selected from the group consisting of alkyl groups containing about 1–8 carbon atoms, aromatic groups containing about 6–20 carbon atoms, and hydrogen; and a second layer deposited on the first layer, the second layer comprising an organosilicon material which has been polymerized and oxidized in a plasma, the second layer containing silicon, oxygen, carbon, and hydrogen.

36 Claims, 3 Drawing Sheets

LAYERED ARTICLE WITH IMPROVED MICROCRACK RESISTANCE AND METHOD OF MAKING

This application is a continuation of application Ser. No. 09/460,057, filed Dec. 13, 1999, now abandoned, which is hereby incorporated by reference in its entirety.

BACKGROUND

1. Field of the Invention

The present invention relates generally to layered articles, and more particularly to a layered article having improved resistance to microcracking.

2. Description of the Related Art

Plastics and other polymers are commercially available materials having physical and chemical properties which are useful in a wide variety of applications. For example, polycarbonates are a class of polymers which, because of their excellent breakage resistance, have replaced glass in many products, such as automobile head-lamps, safety shields, eyewear, and windows. However, many polycarbonates also have properties which may be disadvantageous in some applications, such as low abrasion resistance and susceptibility to degradation from exposure to ultraviolet (UV) light. Thus, polycarbonates are not commonly used in applications such as automotive and other windows which are exposed to ultraviolet light or an abrasive environment.

To lessen the problems of low abrasion resistance and UV degradation, known methods of treating polycarbonates involve the application of one or more layers of abrasion resistant material and UV absorbing material to the polycarbonate substrate. For example, U.S. Pat. No. 4,842,941 describes the application of a silicone layer to a polycarbonate substrate. The silicone layer comprises a dispersion of colloidal silica in a lower aliphatic alcohol-water solution of the partial condensate of a silanol. The silicone layer is applied in a wet process, for example by dipping, the polycarbonate in a silicone bath or by spraying silicone on the polycarbonate. The silicone layer provides abrasion resistance to the polycarbonate and may also include a constituent which absorbs UV radiation.

The silicone layer described in U.S. Pat. No. 4,842,941, however, may develop microcracks when exposed to prolonged weathering. The long term stability and weatherability of the silicone layer, as measured by adhesion and ductility tests, can also be improved.

Another method of providing abrasion resistance involves the application of a plasma polymerized organosilicon coating by plasma enhanced chemical vapor deposition (PECVD). U.S. Pat. No. 5,494,712, for example, describes a method of applying an abrasion resistant layer comprising a plasma polymerized organosilicon material by PECVD. The coatings are described as being able to withstand short term accelerated weathering, such as two hours in boiling water. However, these coatings typically do not adhere to polycarbonate after enhanced weathering such as a few hundred hours in a QUV or Xenon Arc weatherometer. Thus, there exists a need for coatings with improved weatherability.

It would be desirable, therefore, to have a coating with improved abrasion resistance, adhesion, and/or resistance to microcracking.

SUMMARY

The invention, according to one embodiment, relates to a multilayer article which includes a substrate, a first layer comprising a partial condensate of a diorganodiorganooxysilane having the formula $R_2Si(OR')_2$ or an organotriorganooxysilane having the formula $RSi(OR')_3$, or both, where R is independently selected from the group consisting of alkyl groups containing about 1–3 carbon atoms, aromatic groups containing about 6–13 carbon atoms, the vinyl radical, the 3,3,3-trifluoropropyl radical, the gamma-glycidoxypropyl radical and the gamma-methacryloxypropyl radical, and R' is independently selected from the group consisting of alkyl groups containing about 1–8 carbon atoms, aromatic groups containing about 6–20 carbon atoms, and hydrogen; and a second layer deposited on the first layer, the second layer comprising an organosilicon material which has been polymerized and oxidized in a plasma, the second layer containing silicon, oxygen, carbon, and hydrogen.

The invention also relates to a method of forming a multilayer article comprising the steps of applying a first layer to a substrate, the first layer comprising a partial condensate of a diorganodiorganooxysilane having the formula $R_2Si(OR')_2$ or an organotriorganooxysilane having the formula $RSi(OR')_3$, or both, where R is independently selected from the group consisting of alkyl groups containing about 1–3 carbon atoms, aromatic groups containing about 6–13 carbon atoms, the vinyl radical, the 3,3,3-trifluoropropyl radical, the gamma-glycidoxypropyl radical and the gamma-methacryloxypropyl radical, and R' is independently selected from the group consisting of alkyl groups containing about 1–8 carbon atoms, aromatic groups containing about 6–20 carbon atoms, and hydrogen; and applying a second layer on the first layer by plasma polymerizing an organosilicon material in excess oxygen.

The multilayer article, according to exemplary embodiments of the invention, provides improved abrasion resistance to a plastic substrate and increased resistance to microcracking. The embodiments described in the examples below demonstrate that the combination of the first layer and the second layer is surprisingly resistant to microcracking and has good adhesion after exposure to natural or simulated weathering.

BRIEF DESCRIPTION OF THE DRAWINGS

Other features and advantages of the invention will be apparent from the following detailed description and the accompanying drawings, in which.

DETAILED DESCRIPTION OF THE PREFERRED EMBODIMENTS

Figure 1:
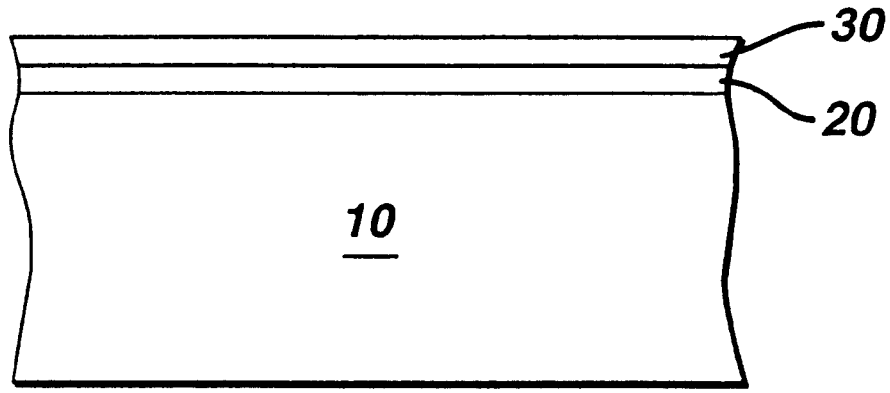
FIG. 1 is a drawing of a layered article according to one embodiment of the invention.
Figure 2:
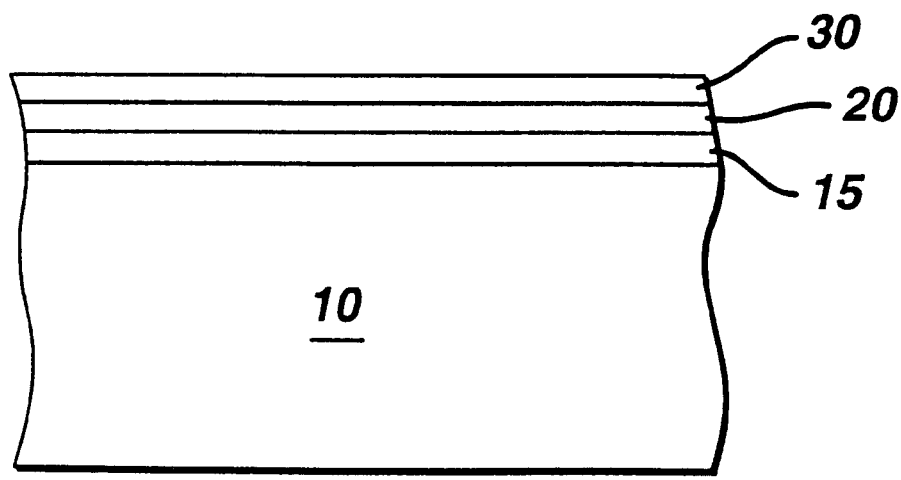
FIG. 2 is a drawing of a layered article according to another embodiment of the invention.

The present invention, according to a preferred embodiment, relates to a layered article comprising a substrate, an interlayer, and an abrasion resistant layer. A primer layer may be formed between the substrate and the interlayer. The primer layer and/or the interlayer may include a UV absorbing material. The layers provide improved weatherability to the substrate. FIG. 1 shows a substrate 10 with an interlayer 20 and an abrasion resistant layer 30. FIG. 2 shows an additional primer layer 15.

The substrate, according to exemplary embodiments of the invention, typically comprises a polymer resin. For example, the substrate may comprise a polycarbonate. Polycarbonates suitable for forming the substrate are well-known in the art and generally comprise repeating units of the formula:

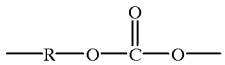

where R is a divalent aromatic radical of a dihydric phenol (e.g., a radical of 2,2-bis(4-hydroxyphenyl)-propane, also known as bisphenol A) employed in the polymer producing reaction; or an organic polycarboxylic acid (e.g. terphthalic acid, isophthalic acid, hexahydrophthalic acid, adipic acid, sebacic acid, dodecanedioic acid, and the like). These polycarbonate resins are aromatic carbonate polymers which may be prepared by reacting one or more dihydric phenols with a carbonate precursor such as phosgene, a haloformate or a carbonate ester, as is well known in the art. One example of a polycarbonate which can be used is LEXAN®, available from General Electric Company.

The substrate may also comprise a polyestercarbonate which can be prepared by reacting a carbonate precursor, a dihydric phenol, and a dicarboxylic acid or ester forming derivative thereof, as is well known in the art.

The substrate may also comprise a thermoplastic or thermoset material. Examples of suitable thermoplastic materials include polyethylene, polypropylene, polystyrene, polyvinylacetate, polyvinylalcohol, polyvinylacetal, polymethacrylate ester, polyacrylic acids, polyether, polyester, polycarbonate, cellulous resin, polyacrylonitrile, polyamide, polyimide, polyvinylchloride, fluorine containing resins and polysulfone. Examples of suitable thermoset materials include epoxy and urea melamine.

Acrylic polymers, also well known in the art, are another material from which the substrate may be formed. Acrylic polymers can be prepared from monomers such as methyl acrylate, acrylic acid, methacrylic acid, methyl methacrylate, butyl methacrylate, cyclohexyl methacrylate, and the like. Substituted acrylates and methacrylates, such as hydroxyethyl acrylate, hydroxybutyl acrylate, 2-ethylhexylacrylate, and n-butylacrylate may also be used.

Polyesters can also be used to form the substrate. Polyesters are well-known in the art, and may be prepared by the polyesterification of organic polycarboxylic acids (e.g., phthalic acid, hexahydrophthalic acid, adipic acid, maleic acid, terphthalic acid, isophthalic acid, sebacic acid, dodecanedioic acid, and the like) or their anhydrides with organic polyols containing primary or secondary hydroxyl groups (e.g., ethylene glycol, butylene glycol, neopentyl glycol, and cyclohexanedimethanol).

Polyurethanes are another class of materials which can be used to form the substrate. Polyurethanes are well-known in the art, and are prepared by the reaction of a polyisocyanate and a polyol. Examples of useful polyisocyanates include hexamethylene diisocyanate, toluene diisocyanate, MDI, isophorone diisocyanate, and biurets and triisocyanurates of these diisocyanates. Examples of useful polyols include low molecular weight aliphatic polyols, polyester polyols, polyether polyols, fatty alcohols, and the like.

Examples of other materials from which the substrate may be formed include acrylonitrile-butadiene-styrene, glass, VALOX® (polybutylenephthalate, available from General Electric Co.), XENOY® (a blend of LEXAN® and VALOX®, available from General Electric Co.), and the like.

The substrate can be formed in a conventional manner, for example by injection molding, extrusion, cold forming, vacuum forming, blow molding, compression molding, transfer molding, thermal forming, and the like. The article may be in any shape and need not be a finished article of commerce, that is, it may be sheet material or film which would be cut or sized or mechanically shaped into a finished article. The substrate may be transparent or not transparent. The substrate may be rigid or flexible.

An interlayer is formed on the substrate according to one embodiment of the invention as shown in FIG. 1. The interlayer 20 typically comprises a dispersion of colloidal silica in an aliphatic alcohol-water solution of the partial condensate of a diorganodiorganooxysilane having the formula $R_2Si(OR')_2$ or an organotriorganooxysilane having the formula $RSi(OR')_3$, or both, where R is independently selected from the group consisting of alkyl groups containing about 1–3 carbon atoms, aromatic groups containing about 6–13 carbon atoms, the vinyl radical, the 3,3,3-trifluoropropyl radical, the gamma-glycidoxypropyl radical and the gamma-methacryloxypropyl radical, and R' is independently selected from the group consisting of alkyl groups containing about 1–8 carbon atoms, aromatic groups containing about 6–20 carbon atoms, and hydrogen.

Typically, the diorganodiorganooxysilane and the organotriorganooxysilane are precursors to a silanol of the formula $RSi(OH)_3$ or $R_2Si(OH)_2$, respectively, in which R is selected from the group consisting of alkyl radicals of 1 to 3 carbon atoms, the vinyl radical, the 3,3,3-trifluoropropyl radical, the gamma-glycidoxypropyl radical and the gamma-methacryloxypropyl radical.

The major portion of the partial condensate is typically obtained from the condensation of $CH_3Si(OH)_3$, a minor portion, if desired, being obtained from cocondensation with $C_2H_5Si(OH)_3$, $C_3H_7Si(OH)_3$, $CH_2CHSi(OH)_3$,

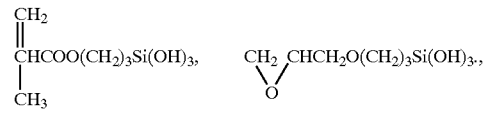

or mixtures thereof. Typically, at least 70 weight percent of the silanol comprises $CH_3Si(OH)_3$.

The partial condensate is typically in a solution which includes a colloidal silica dispersion and a lower aliphatic alcohol-water cosolvent. The alcohol is typically a lower aliphatic alcohol, e.g. less than 6 carbon atoms. Suitable lower aliphatic alcohols include methanol, ethanol, isopropanol, and t-butyl alcohol, for example. Mixtures of such alcohols can be used. The solvent system typically contains from about 20 to 75 weight-percent alcohol.

The particles in the colloidal silica dispersion generally have a diameter in the range of 5 to 150 nanometers. Silica dispersions can be prepared by methods well-known in the art and are commercially available under such registered trademarks as "Ludox" (Dupont) and "Nalcoag" (NALCO Chemical Co.). Typically, colloidal silica of 10–30 nanometer particle size is used in order to obtain dispersions having a desirable stability and to provide coatings having desirable optical properties.

The dispersion typically contains from 10 to 50 percent by weight of solids, the solids consisting essentially of 10 to 70 percent by weight of colloidal silica and from 30 to 90 percent by weight of the partial condensate.

The interlayer compositions can be prepared by adding trialkoxysilanes, such as $RSi(OCH_3)_3$, to colloidal silica hydrosols and adjusting the pH to the desired level by addition of an acid. Suitable trialkoxysilanes are those containing methoxy, ethoxy, isopropoxy and t-butoxy substituents, which upon hydrolysis liberate the corresponding alcohol, thus generating at least a portion of the alcohol present in the coating composition. Upon generation of the silanol in the acidic aqueous medium, there is condensation of the hydroxyl substituents to form —Si—O—Si bonding. The condensation is not complete, but rather the siloxane retains an appreciable quantity of silicon-bonded hydroxyl groups, thus rendering the polymer soluble in the water-alcohol solvent. This soluble partial condensate can be characterized as a siloxanol polymer typically having at least one silicon-bonded hydroxyl group per every three —SiO— units. During curing of the coating on a substrate, these residual hydroxyls condense to give a silsesquioxane, $RSiO_{3/2}$.

To obtain desirable properties in the interlayer and to prevent rapid gellation of the interlayer composition, sufficient acid to provide a pH of from 3.0 to 6.0 is typically present. A composition having a pH in the range of 6.0–8.0 can also be used, however. Suitable acids include both organic and inorganic acids such as hydrochloric, acetic, chloroacetic, citric, benzoic, dimethylmalonic, formic, glutaric, glycolic, maleic, malonic, toluene-sulfonic, oxalic and the like.

The acid can be added to either the silane or the hydrosol prior to mixing the two components, provided that the mixing is done rapidly. The amount of acid necessary to obtain the desired pH will depend on the alkali metal content of the silica, but is usually less than one weight percent of the composition. Alcohol is generated by hydrolysis of the alkoxy substituents of the silane. For example, hydrolysis of one mole of —Si(OC$_2$H$_3$)$_3$ generates 3 moles of ethanol. Depending upon the percent solids desired in the final composition, additional alcohol, water or a water-miscible solvent can be added. The interlayer composition is typically well mixed and allowed to age for a short period of time to ensure formation of the partial condensate. The interlayer composition thus obtained is a clear or slightly hazy low viscosity fluid which is stable for several days.

The interlayer compositions can be applied to solid substrates by conventional methods, such as flowing, spraying, brushing, roll coating, curtain coating, and dip coating to form a continuous surface film. Typically, the interlayer has a thickness of 1–15 microns, more typically 3–12 microns, more typically 5–10 microns. The composition will air dry to a tack-free condition, but heating in the range of 50–150° C. may be necessary to obtain condensation of residual silanols in the partial condensate. This final cure results in the formation of a silsesquioxane of the formula $RSiO_{3/2}$. Additional information regarding interlayer compositions which can be used with exemplary embodiments of the invention is disclosed in U.S. Pat. Nos. 4,027,073; 4,419,405; and 4,914,143, all of which are incorporated herein by reference.

An abrasion resistant layer is typically applied over the interlayer, as shown in FIG. 1. The abrasion resistant layer 30 increases the scratch resistance of the layered article and typically comprises a plasma polymerized organosilicon material containing silicon, hydrogen, carbon, and oxygen, generally referred to as $SiO_xC_yH_z$. Typically, 0.5<X<2.4, 0.3<Y<1.0, and 0.7<Z<4.0. The abrasion resistant layer typically has a thickness of 0.5–5.0 microns, more typically 1.0–4.0 microns, more typically 2.0–3.0 microns.

The abrasion resistant layer is typically applied by plasma enhanced physical vapor deposition (PECVD) in which capacitive coupling or inductive coupling is used to introduce energy into the system using known types of plasma polymerization equipment. According to exemplary embodiments of the invention, PECVD is used to initiate the polymerization and oxidation reactions of an organosilicon compound and excess oxygen employing a power density ranging from $10^6$ to $10^8$ joules/kilogram (J/Kg). Higher power densities may produce films which easily crack while lower densities may produce films which are less abrasion resistant. Typically, oxygen is present in an amount in excess of that stoichometrically necessary to oxidize all silicon and carbon in the organosilicon compound.

Power density is the value of W/FM wherein W is an input power applied for plasma generation expressed in J/sec, F is the flow rate of the reactant gases expressed in moles/sec, and M is the molecular weight of the reactant in Kg/mole. For a mixture of gases the power density can be calculated from $W/\Sigma F_i M_i$ wherein "i" indicates the "ith" gaseous component in the mixture. By practicing within the power density range and with excess oxygen a single polymerized protective layer can be formed on the substrate surface, the layer being substantially non-cracking, clear, colorless, hard and strongly adhered thereto.

The polymer is further characterized as being a highly crosslinked polymer containing at least one of the following:

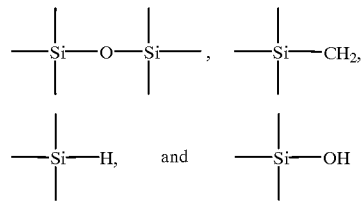

functional groups, and trapped water.

Figure 3:
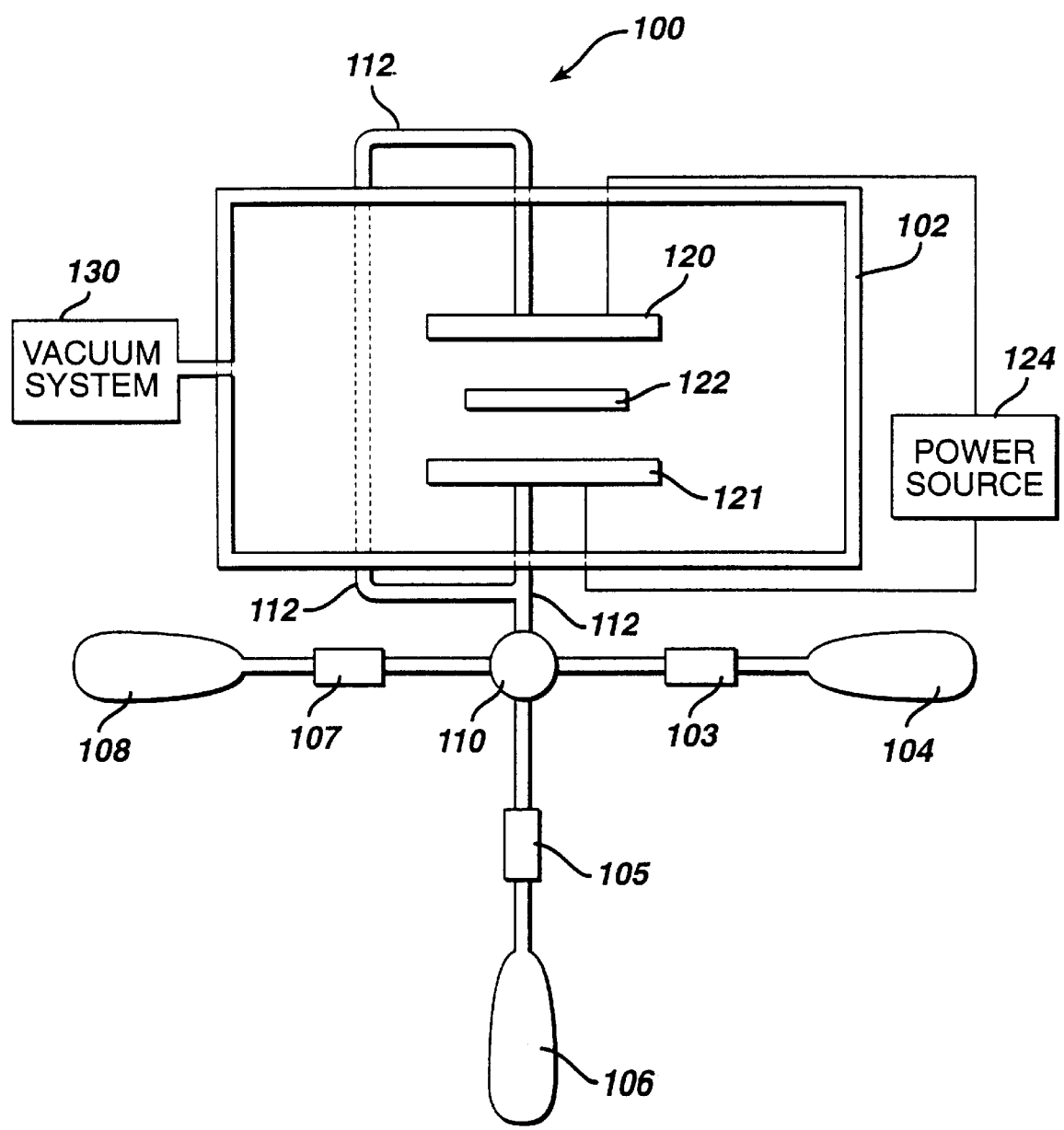
FIG. 3 is a drawing of an apparatus which can be used to form layered articles according to exemplary embodiments of the invention.

FIG. 3 illustrates an example of an apparatus 100 which can be used to form a plasma-polymerized film on the surface of a substrate. The apparatus 100 includes a power source 124 which may comprise a variable frequency power source. The apparatus comprises a reactor vessel 102 into which the gaseous reactants are introduced from an organosilicon monomer source 104, an oxygen source 106, and an inert gas source 108 through mass flow controllers 103, 105, 107, respectively. If desired, the different gases and vapors from the indicated sources can be mixed in a mixer 110 prior to introducing them into the reactor vessel. The reactor vessel 102 is connected to a vacuum system 130 for evacuating the vessel.

Disposed in the reactor vessel 102 are a pair of opposed electrodes 120 and 121. The substrate 122 to be treated is placed between the electrodes 120 and 121. Typically, the electrodes 120 and 121 are connected to the variable frequency power source 124, while the vessel 102 is grounded, and the substrate 122 floats electrically. The electrodes 120 and 121 can be shower head type electrodes which include a number of inlet holes through which the gaseous reactants are dispersed into the interior of the vessel 102 from gas supply lines 112.

Figure 4:
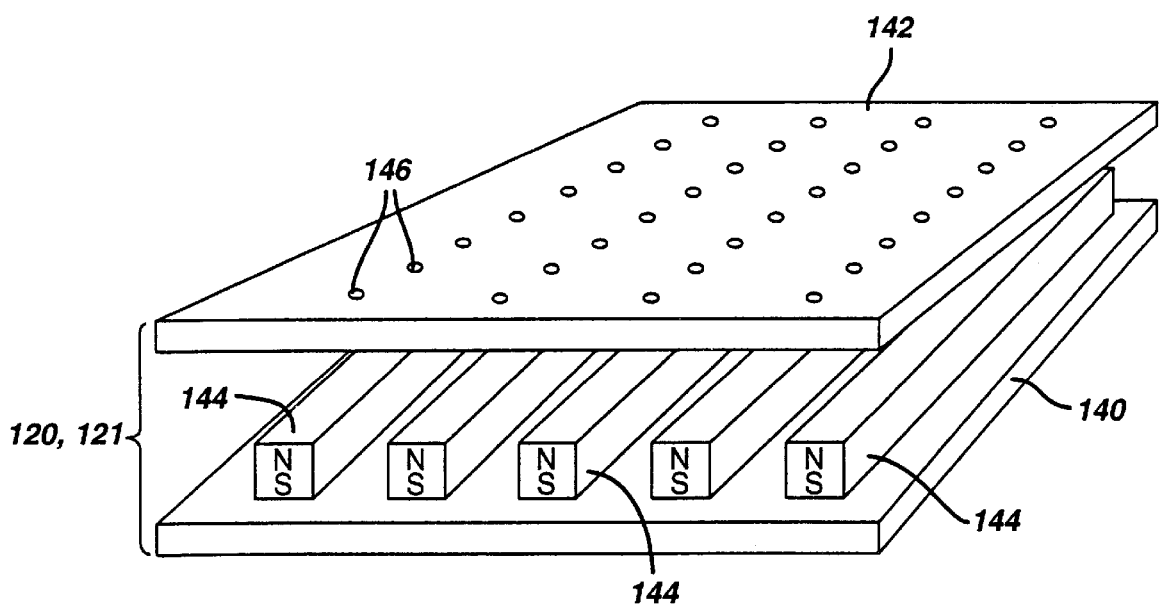
FIG. 4 is a drawing of an exemplary electrode which can be used with the apparatus of FIG. 3.

As shown in FIG. 4, the electrodes may include a series of magnets 144 which produce a magnetic field to increase the density of the plasma. The electrodes typically include a rear plate 140 and a front plate 142 which may contain holes 146 for introduction of gaseous reactants into the vessel 102. The magnets 144 are typically configured such that each magnetic pole of each magnet 144 produces a magnetic field with the opposite magnetic pole of the same magnet. In this way, the magnets may be arranged such that a component of the magnetic field is parallel to the electrode surface. Consequently, the ExB force will result in confinement of secondary electrons emitted from the surface of the electrode, which increases the density and uniformity of the plasma. The resulting plasma also extends a greater distance from the electrode.

In operation, the abrasion resistant layer can be formed by first evacuating the reactor vessel 102 with the vacuum pump 130 prior to introducing the gaseous reactants. Next, an inert gas such as argon is introduced into the vessel 102 at a predetermined flow rate. The plasma is then generated and allowed to stabilize. After the plasma stabilizes, oxygen and an organosilicon such as tetramethyldisiloxane (TMDSO) are introduced into the chamber. The abrasion resistant layer is typically deposited directly on the interlayer at a power level of $10^6$–$10^8$ J/Kg in the presence of excess oxygen and comprises an organosilicon material which has been polymerized and oxidized such that it contains silicon, oxygen, carbon, and hydrogen.

Alternatively, the abrasion resistant layer can be subdivided into two sequentially applied sub-layers. When depositing the first sublayer, an inert gas such as argon is first introduced into the vessel 102 at a predetermined flow rate. The plasma is then generated and allowed to stabilize. After the plasma stabilizes, an organosilicon such as TMDSO is introduced into the chamber. Typically, the flow ratio of TMDSO to argon is about 2:1. The argon and organosilicon flow is then terminated.

When depositing the second sublayer, oxygen is first introduced into the chamber 102 at a predetermined flow rate. The plasma is then generated and allowed to stabilize. After the plasma stabilizes, an organosilicon such as TMDSO is introduced into the chamber. The second sublayer is typically deposited at a power level of $10^6$–$10^8$ J/Kg in the presence of excess oxygen and comprises an organosilicon material which has been polymerized and oxidized such that it contains silicon, oxygen, carbon, and hydrogen. Typically, the flow ratio of TMDSO to oxygen is about 1:1. The thickness of the second sublayer is typically 1–30 times the thickness of the first sublayer. For example, the first sublayer may have a thickness of 0.05–1.5 microns, and the second sublayer may have a thickness of 0.5–3.0 microns.

Alternatively, the transition from the first sublayer to the second sublayer can be achieved by ramping down the argon flow while ramping up the oxygen flow.

The plasma causes the reactants to polymerize and form a plasma-polymerized film on the substrate 122. The film-forming materials are typically in gaseous form. Gaseous reactants, such as organosilicon monomers, are vaporized from the liquid form prior to entry into the reactor chamber.

The organosilicon compounds typically used are organic compounds in which at least one silicon atom is bonded to at least one carbon atom and include, for example, silanes, siloxanes and silazanes. These organosilicon compounds may be used individually or in combinations of two or more. Examples of silanes include dimethoxydimethylsilane, methyltrimethoxysilane, tetramethoxysilane, ethyltrimethoxysilane, diethoxydimethylsilane, methyltriethoxysilane, octamethylcyclotetrasilane, triethoxyvinylsilane, tetraethoxysilane, dimethoxymethylphenylsilane, phenyltrimethoxysilane, 3-glycidoxypropyltrimethoxysilane, 3-methacryloxypropyltrimthoxysilane, diethoxymethylphenylsilane, tris(2-methoxyethoxy) vinylsilane, phenyltriethoxysilane, and dimethoxydiphenylsilane.

Examples of siloxanes include tetramethyldisiloxane (TMDSO), hexamethyldisiloxane (HMDSO), and octamethylcyclotetrasiloxane (D4). Examples of silazanes include hexamethyldisilazane and tetramethyldisilazane. To enhance the adhesion of the interlayer 20 to the substrate 10, a primer layer 15, as shown in FIG. 2, can be applied to the substrate 10 prior to formation of the interlayer 20. The primer layer 15 may comprise a thermoset or thermoplastic material, for example. Typically, the primer layer has a thickness of about 0.2–2.0 microns, more typically 0.4–1.2 microns, more typically 0.6–1.0 microns. The primer layer may also include a UV absorbing material, as will be described below.

According to one embodiment, the primer layer material is a thermoset primer comprising a thermosettable acrylic polymer. The thermosettable acrylic polymer is part of an emulsion which also contains water, a hydroxy ether or an alkanol containing from 1 to 4 carbon atoms, and at least one ultraviolet light absorbing compound (described below). The primer emulsion composition generally contains, in percent by weight, from about 1 to about 10 percent thermosettable acrylic solids, from about 1 to about 10 percent of at least one ultraviolet light absorbing compound, from about 20 to about 40 percent of a hydroxy ether or an alkanol, and from about 40 to about 78 percent of water.

Thermosettable acrylic polymers which can be used in the emulsion are well known in the art. Exemplary thermosettable acrylics are set forth, for example, in The Encyclopedia of Polymer Science and Technology, Vol. 1, Interscience Publishers, John Wiley & Sons, Inc., 1964, at p. 273 et seq., and in Chemistry of Organic Film Formers, by D. H. Solomon, John Wiley & Sons, Inc., 1977 at p. 263 et seq., and the references cited therein, all of which are incorporated herein by reference.

The hydroxy ethers are represented by the general formula:

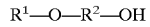

wherein $R^1$ is an alkyl or an alkoxy alkyl radical containing from 1 to about 6 carbon atoms and $R^2$ is an alkylene radical containing from 1 to about 6 carbon atoms, provided that the sum of the carbon atoms present in $R^1$ and $R^2$ is from 3 to about 10. The alkanols containing from 1 to 4 carbon atoms include methanol, ethanol, propanol, isopropanol, tert-butanol and the like.

In forming the primer layer according to this embodiment, a substantial portion of the water and hydroxy ether or alkanol components of the primer composition are evaporated off and the resulting solid layer comprised of the thermosettable acrylic polymer and the ultraviolet light absorber is thermally cured to provide a thermoset acrylic primer layer containing an ultraviolet light absorber. Additional description of thermoset primer materials is disclosed in U.S. Pat. No. 4,242,381 which is incorporated herein by reference. Thermosetting acrylic polymer emulsion concentrates are also commercially available, for example from Rohm & Haas in Philadelphia, Pa. as "Rhoplex".

According to another embodiment, the primer layer may comprise a thermoplastic material. Exemplary thermoplastic acrylic polymers are set forth, for example, in Encyclopedia of Polymer Science and Technology, Vol. 1, Interscience Publishers, John Wiley & Sons, Inc., (1964), at p. 246 et seq. and the reference cited therein, all of which are hereby incorporated by reference.

The term "thermoplastic acrylic polymers" refers to thermoplastic polymers resulting from the polymerization of one or more acrylic acid ester monomers as well as methacrylic acid ester monomers. These monomers are represented by the general formula

wherein Y is H or a methyl radical and $R^1$ is an alkyl radical, preferably one containing from 1 to about 20 carbon atoms.

The thermoplastic acrylic polymers are in general applied as primers from a primer composition containing the thermoplastic acrylic polymer and a volatile solvent, either organic or inorganic in nature, which is generally substantially inert, i.e., will not too adversely affect the substrate, e.g. polycarbonate, to be treated, but which is capable of dissolving the thermoplastic acrylic polymers. Generally, the concentration of the thermoplastic acrylic polymer in the priming composition ranges from about 0.5 to about 25 percent by weight, preferably from about 1 to about 15 percent by weight. Examples of suitable solvents include ethylene glycol diacetate, butoxyethanol, ethoxyethanol, methoxypropanol, diacetone alcohol, and the like or mixtures thereof.

A uniform film of the thermoplastic primer composition is applied onto the substrate, e.g. polycarbonate, surface by any known method such as dipping, spraying, roll-coating and the like. After the formed polycarbonate part is coated with the primer composition, the inert volatile solvent may be removed by drying the coated article until the volatile solvent evaporates, leaving a primer layer of coating containing the thermoplastic acrylic polymer on the polycarbonate surface to which the primer composition was applied. Additional details are disclosed in U.S. Pat. No. 4,224,378, which is incorporated herein by reference.

Other primers which can be used include those manufactured by B. F. Goodrich Company. For example an acrylic material comprising a 50/50 by weight blend of two thermosettable acrylic emulsions known as Hycar 237 and Hycar 256 can be used.

Various UV absorbing materials may be incorporated into the primer layer 15 and/or the interlayer 20 described above. The UV materials protect the substrate, e.g. polycarbonate, from degradation exhibited as yellowing by absorbing the UV radiation. According to one embodiment, the UV absorbing material comprises a silylated hydroxybenzophenone having the following formula:

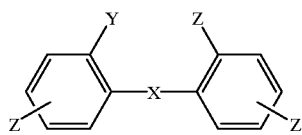

wherein:

X is

or

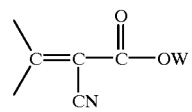

Y is H or OH;

Z is H, OH, OQ or OW;

Q is a $-CH_2(CH_2)_nSi(R_2)_u(OR_1)_v$; and

W is $-C_mH_{2m+1}$;

where U is 0, 1 or 2, V is 1, 2 or 3, U+V=3, $R_1$ is an alkyl or alkanoyl having 1 to 6 carbon atoms, $R_2$ is an alkyl having 1 to 6 carbon atoms, preferably methyl, n is 0, 1 or 2, and m=1 to 18.

A preferred UV absorbing material for the primer layer is 2-ethylhexyl-2-cyano-3,3-diphenylcyanoacrylate, described by the above formula in which Y is hydrogen, Z is hydrogen, and X is:

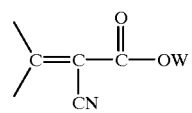

and W is $C_8H_{17}$. This compound is available from GAF Corporation as Uvinul N-539™.

The ultraviolet light absorbing agents may be prepared, for example, by a convenient method starting with a compound having the formula:

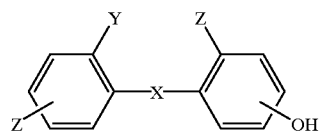

in which X, Y and Z are as defined above. In this method, one mole of the above compound is reacted in a solvent with one mole of a base, e.g., sodium methylate, to form a salt, e.g., a monosodium salt, which in turn is reacted with a halogenated alkoxysilane or alkanoyloxysilane having the formula $ClCH_2(CH_2)_nSi(R_2)_x(OR_1)_y$.

This embodiment of the UV absorbing material may be incorporated into the interlayer 20, as well as into the thermoset or thermoplastic primer layers 15 as described above. Additional details of the silylated hydroxybenzophenone UV absorbing material are disclosed in U.S. Pat. No. 4,419,405, which is incorporated herein by reference.

According to another embodiment of the invention, the UV absorber comprises at least one polybenzoylresorcinol having the formulae

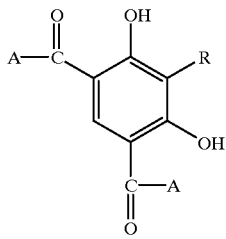

OR

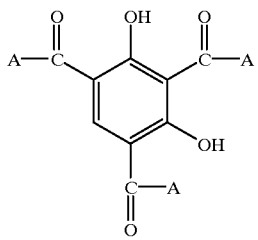

wherein each A is independently a substituted or unsubstituted monocyclic or polycyclic aromatic radical, and the substituted monocyclic or polycyclic aromatic radical has substituents selected from the group consisting of hydrogen, halogens, alkoxy groups, $C_{1-8}$ alkyl groups and hydroxy groups and R is hydrogen or a linear or branched aliphatic chain having less than about 10 carbons. The polybenzoylresorcinols are typically 4,6-dibenzoylresorcinol, 4,6-di-(4'-t-butylbenzoyl)resorcinol, 4,6-dibenzoyl-2-propylresorcinol and 2,4,6-tribenzoylresorcinol.

This embodiment of the UV absorber can be incorporated into a thermoset primer, for example, as a component of the thermoset primer emulsion composition, as described above. The UV absorber can also be incorporated into the thermoplastic primer or the interlayer described above. Additional details are disclosed in U.S. Pat. No. 5,869,185 which is hereby incorporated by reference.

The following examples further illustrate the features and advantages of various embodiments of the invention.

EXAMPLE 1

An acrylic based primer layer was applied to a privacy grade back window for a car comprising a polycarbonate. The acrylic material was a 50/50 by weight blend of two thermosettable emulsions supplied by the B. F. Goodrich Company, Hycar 237 and Hycar 256. The emulsions were combined with 2-ethylhexyl-2-cyano-3,3-diphenylcyanoacrylate (a UV absorbing material known as Uvinul N-539™, available from GAF Corp.), citric acid, and aqueous butoxyethanol, such that the solids consisted of 2.56% by weight of acrylic polymers, 1.44% by weight of 2-ethylhexyl-2-cyano-3,3-diphenylcyanoacrylate, and 0.025% by weight of citric acid in 25% by weight 2-butoxyethanol/75% by weight water.

The primer was applied to the polycarbonate substrate and allowed to air dry for 20–30 minutes. Following air drying, the primer was thermally cured for 60 minutes at 129° C. (265° F.). The thickness ranged between 0.5 and 1.0 micron.

After cooling, an interlayer was applied. The interlayer comprised about 10% by weight of the silylated hydroxybenzophenone ultraviolet light absorbing agent described above and in U.S. Pat. No. 4,419,405 and a dispersion of colloidal silica in an aliphatic alcohol-water solution of the partial condensate of the hydrolysis product of methyltrimethoxysilane. The dispersion contained 25% by weight of solids and had a pH of approximately 7.5.

While maintaining a slight air flow to stay below explosion limits for the solvents, the coated part was air dried for approximately 30 minutes. Following air drying, the interlayer was cured at approximately 130° C. for 1 hour. The thickness of the cured interlayer varied between 4 and 10 microns. After weathering in Florida at five degrees off horizontal for 1 year, there was no adhesion loss, but there was micro cracking. Adhesion was measured with a cross-cut tape test specified by ASTM D 3359-92a, test method B.

EXAMPLE 2

A second back window was prepared. The second back window was the same as the window in Example 1 except that it was additionally coated with an abrasion resistant layer comprising 2 sublayers as described above. The abrasion resistant layer was applied by plasma polymerization of tetramethyldisiloxane (TMDSO). The plasma polymerization was carried out in a PECVD apparatus as illustrated in FIG. 3. For the first sublayer, the reagents were TMDSO and argon with a flow ratio of 2:1 (TMDSO:argon). The power density was $7 \times 10^7$ J/Kg. The pressure was 3 millitorr, and the duration was 3 minutes. For the second sublayer, the reagents were TMDSO and oxygen with a flow ratio of 1:1 (TMDSQ:oxygen). The power density was $7 \times 10^7$ J/Kg. The pressure was 3 millitorr, and the duration was 73 minutes. The total thickness of the two sublayers was about 2.5 microns.

After weathering in Florida at five degrees off horizontal for 1 year, the sample passed the ASTM D 3359-92a adhesion test, and there was also no micro cracking.

EXAMPLE 3

A sample was prepared of polycarbonate/primer/interlayer which was identical to Example 1, except that the interlayer had a pH of 5. The sample was exposed to 6875 kJ/m² of radiation in an Atlas Xenon Arc Weatherometer according to ASTM G26. ASTM G26 specifies a continuous exposure to light and intermittent exposure to water spray. The cycle was 102 minutes of light followed by a cycle of 18 minutes of light and water spray. After an exposure of 6875 KJ/M², the sample passed the ASTM D 3359-92a adhesion test, but exhibited extreme microcracking.

EXAMPLE 4

A sample was prepared which was identical to Example 3, except it was additionally coated with an abrasion resistant layer comprising two sublayers as described above. The abrasion resistant layer was applied by plasma polymerization of tetramethyldisiloxane (TMDSO). The plasma polymerization was carried out in a PECVD apparatus as illustrated in FIG. 3. For the first sublayer, the reagents were TMDSO and argon with a flow ratio of 2:1 (TMDSO:argon). The power density was $7 \times 10^7$ J/Kg. The pressure was 3 millitorr, and the duration was about 3 minutes. For the second sublayer, the reagents were TMDSO and oxygen with a flow ratio of 1:1 (TMDSO: oxygen). The power density was $7 \times 10^7$ J/Kg. The pressure was 3 millitorr, and the duration was about 27 minutes. The total thickness of the two sublayers was about 1 micron.

The sample was exposed to 6875 kJ/m² of radiation in an Atlas Xenon Arc Weatherometer according to ASTM G26.

The sample passed the ASTM D 3359-92a adhesion test and did not exhibit any microcracking.

EXAMPLE 5

A sample was prepared which was identical to example 4, except that the thickness of the abrasion resistant layer was 4 microns. The sample was exposed to 6875 kJ/m$^2$ of radiation in an Atlas Xenon Arc Weatherometer according to ASTM G26. The sample passed the ASTM D 3359-92a adhesion test and did not exhibit any microcracking.

The examples demonstrate that the combination of the disclosed interlayer and abrasion resistant layer is surprisingly resistant to microcracking and has good adhesion after exposure to natural or simulated weathering.

Other embodiments of the invention will be apparent to those skilled in the art from a consideration of this specification or practice of the invention disclosed herein. It is intended that the specification and examples be considered as exemplary only, with the true scope and spirit of the invention being defined by the following claims.

What is claimed is:

1. A multilayer article comprising:
    a substrate;
    a first layer comprising an ultraviolet radiation absorbing material, the ultraviolet radiation absorbing material comprising at least one polybenzoylresorcinol, and a partial condensate of a diorganodiorganooxysilane having the formula $R_2Si(OR')_2$ or an organotriorganooxysilane having the formula $RSi(OR')_3$, or both, where R is independently selected from the group consisting of alkyl groups containing about 1–3 carbon atoms, aromatic groups containing about 6–13 carbon atoms, vinyl radical, 3,3,3-trifluoropropyl radical, gamma-glycidoxypropyl radical and gamma-methacryloxypropyl radical, and R' is independently selected from the group consisting of alkyl groups containing about 1–8 carbon atoms, aromatic groups containing about 6–20 carbon atoms, and hydrogen; and
    a second layer comprising a plasma polymerized organosilicon, the second layer being deposited at a power level of $10^6–10^8$ J/Kg in the presence of excess oxygen.

2. A multilayer article comprising:
    a substrate;
    a first layer comprising an ultraviolet radiation absorbing material, the ultraviolet radiation absorbing material comprising at least one polybenzoylresorcinol, and a partial condensate of a diorganodiorganooxyslane having the formula $R_2Si(OR')_2$ or an organotriorganooxysilane having the formula $RSi(OR')_3$, or both, where R is independently selected from the group consisting of alkyl groups containing about 1–3 carbon atoms, aromatic groups containing 6–13 carbon atoms, vinyl radical, 3,3,3-trifluoropropyl radical, gamma-glycidoxypropyl radical and Gardena-methacryloxypropyl radical, and R' is independently selected from the group consisting of alkyl groups containing about 1–8 carbon atoms, aromatic groups containing about 6–20 carbon atoms, and hydrogen; and
    a second layer comprising a plasma polymerized organosilicon;
    wherein the article remains substantially free of microcracks after being exposed to 6875 kJ/m$^2$ of radiation in an ASTM G26 cycle in a xenon arc weatherometer.

3. A multilayer article comprising:
    a substrate;
    a fist layer comprising an ultraviolet radiation absorbing material, the ultraviolet radiation absorbing material comprising at least one polybenzoylresorcinol, and a partial condensate of a diorganodiorganooxysilane having the formula R2Si(OR')2 or an organoiorganooxysilane having the formula RSi(OR')3, or both, where R is independently selected from the group consisting of alkyl groups containing about 1–3 carbon atoms, aromatic groups containing about 6–13 carbon atoms, vinyl radical, 3,3,3-trifluoropropyl radical, gamma-glycidoxypropyl radical and gamma-methacryloxypropyl radical, and R' is independently selected from the group consisting of alkyl groups containing about 1–8 carbon atoms, aromatic groups containing about 6–20 carbon atoms, and hydrogen; and
    a second layer deposited on the first layer, the second layer comprising an organosilicon material which has been polymerized and oxidized in a plasma, the second layer containing silicon, oxygen, carbon, and hydrogen.

4. The article of claim 3, wherein the diorganodiorganooxysilaned or the organotriorganooxysliane comprise a silanol of the formula $R_2Si(OH)_2$ or $RSi(OH)_3$, respectively, in which R is selected from the group consisting of alkyl radicals of 1 to 3 carbon atoms, vinyl radical, 3,3,3-trifluoropropyl radical, gamma-glycidoxypropyl radical and gamma-metbacryloxypropyl radical.

5. The article of claim 4, wherein the first layer further comprises colloidal silica.

6. The article of claim 5, wherein the colloidal silica comprises particles having a diameter of 10–30 nanometers.

7. The article of claim 5, wherein at least 70 weight percent of the silanol comprises $CH_3Si(OH)_3$ and $(CH_3)_2Si(OH)_2$.

8. The article of claim 5, wherein the first layer comprises 10 to 70 weight percent of the colloidal silica and 30 to 90 weight percent of the partial condensate.

9. The article of claim 5, wherein the first layer is applied by at least one of: flowing, spraying, dipping, brushing, roll coating, and curtain coating.

10. The article of claim 5, wherein the second layer is formed by plasma enhanced chemical vapor deposition of an organosilicon monomer.

11. The article of claim 10, wherein the organosilicon monomer comprises at least one of: tetramethyldisiloxane, hexamethyldisiloxane, and octamethylcyclotetrasiloxane.

12. The article of claim 5, further comprising a primer layer between the substrate and the first layer.

13. The article of claim 12, wherein the primer layer comprises a thermoplastic acrylic.

14. The article of claim 12, wherein the primer layer comprises a thermoset acrylic.

15. The article of claim 12, wherein the primer layer includes an ultraviolet radiation absorbing material.

16. The article of claim 12, wherein the primer layer has a thickness of 0.2–2.0 microns.

17. The article of claim 12, wherein the primer layer has a thickness of 0.6–1.0 microns.

18. The article of claim 5, wherein the first layer has a thickness of 1–15 microns.

19. The article of claim 5, wherein the first layer has a thickness of 5–10 microns.

20. The article of claim 5, wherein the second layer has a thickness of 0.5–5.0 microns.

21. The article of claim 5, wherein the second layer has a thickness of 2.0–3.0 microns.

22. The article of claim 3, wherein the second layer comprises a plasma polymerized and oxidized organosilicon material having a the formula SiOxCyHz, where 0.5<x<2.4; 0.3<y<1.0; and 0.7<z<4.0.

23. The article of claim 3, wherein the second layer is applied by plasma enhanced chemical vapor deposition.

24. The article of claim 23, wherein the second layer is deposited at a power level of $10^6$–$10^8$ J/Kg in the presence of excess oxygen.

25. The article of claim 23, wherein the article remains substantially free of microcracks after being exposed to 6875 kJ/m$^2$ of radiation in an ASTM G26 cycle in a xenon arc weatherometer.

26. A method of forcing a multilayer article comprising:

N applying a first layer to a substrated, the first layer comprising an ultraviolet radiation absorbing material, the ultraviolet radiation absorbing material comprising at least one polybenzoylresorcinol, and a partial condensate of a diorganodiorganooxysilane having the formula R2Si(OR')2 or an organotriorganooxysilane having the formula RSi(OR')3, or both, where R is independently selected from the group consisting of alkyl groups containing about 1–3 carbon atoms, aromatic groups containing about 6–13 carbon atoms, vinyl radical, 3,3,3-trifluoropropyl radical, gamma-glycidoxypropyl radical and gamma-methacryloxypropyl radical, and R' is independently selected from the group consisting of alkyl groups containing about 1-S carbon atoms, aromatic groups containing about 6–20 carbon atoms, and hydrogen; and applying a second layer on the first layer by plasma polymerizing an organosilicon material in excess oxygen.

27. The method of claim 26, wherein the organosilicon material is plasma polymerized at a power density of $10^6$–$10^8$ J/Kg.

28. The method of claim 26, wherein the second layer is applied by plasma enhanced chemical vapor deposition.

29. The method of claim 26, wherein the second layer comprises a polymerized and oxidized organosilicon material having the formula SiOxCyHz, where 0.5<x<2.4; 0.3<y<1.0; and 0.7<z<4.0.

30. The method of claim 26, wherein the first layer further comprises colloidal silica.

31. The method of claim 26, wherein the first layer is applied by at least one of: flowing, spraying, dipping, brushing, roll coating, and curtain coating.

32. The method of claim 26, further comprising the step of curing the first layer.

33. The method of claim 26, wherein the article remains substantially free of microcracks after being exposed to 6875 kJ/m$^2$ of radiation in an ASTM G26 cycle in a xenon arc weatherometer.

34. The method of claim 26, further comprising the step of applying a primer layer between the substrate and the first layer.

35. The method of claim 34, wherein the primer layer comprises a thermoplastic acrylic material.

36. The method of claim 34, wherein the primer layer comprises a thermoset acrylic material.

* * * * *